E. I. YOUNG.
ICE CREAM FREEZER DASHER.
APPLICATION FILED APR. 30, 1909.
1,033,649.
Patented July 23, 1912.
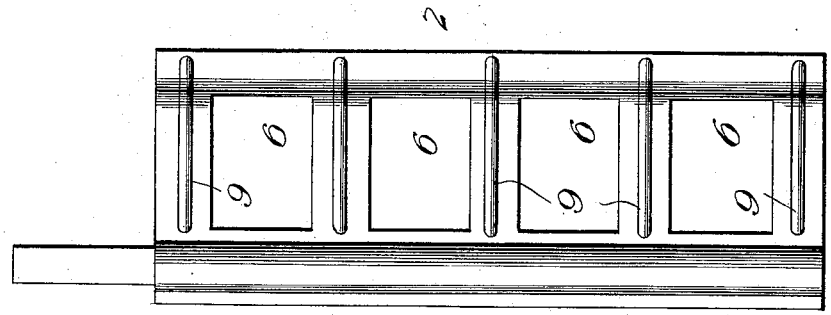
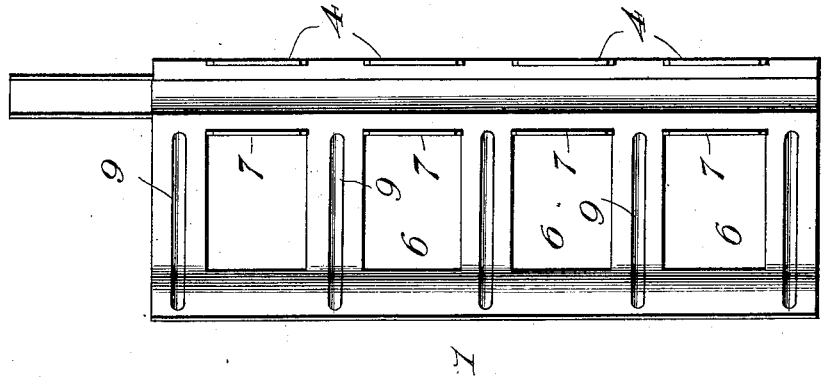

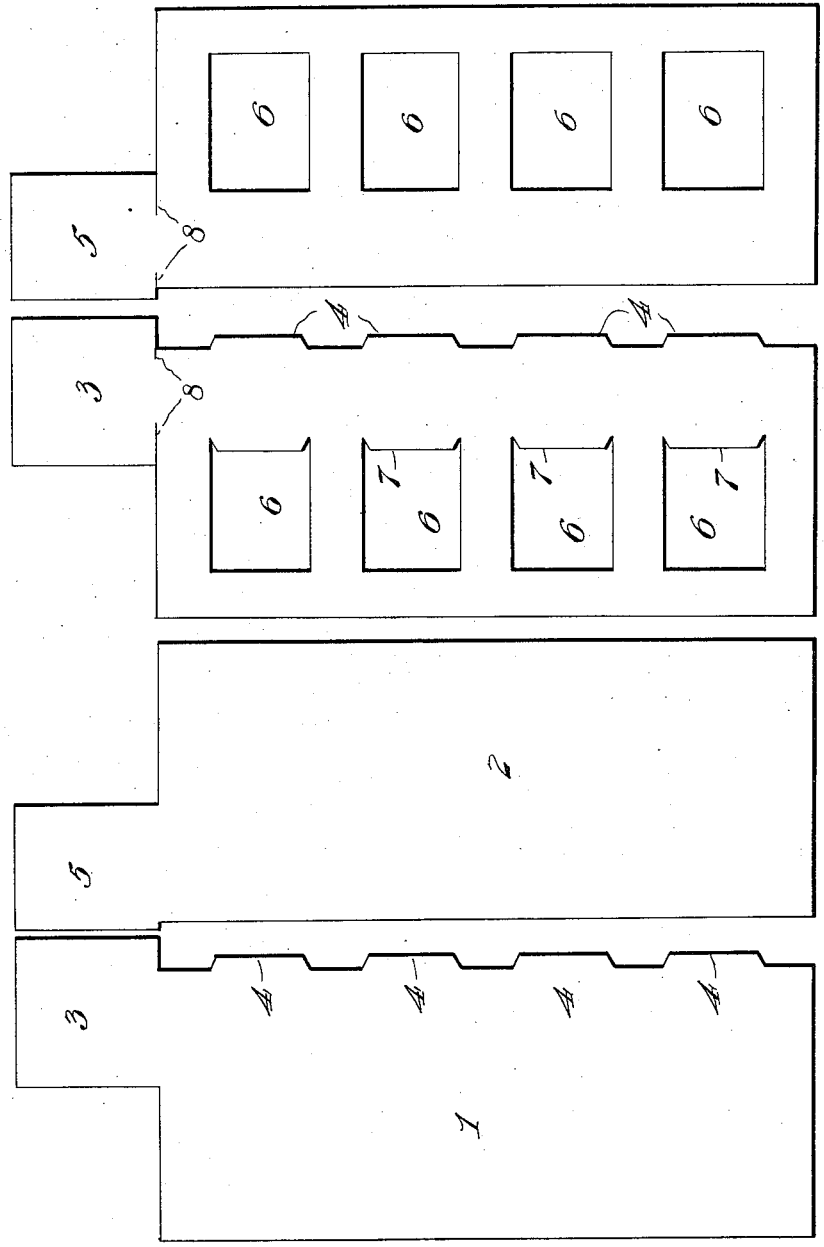

E. I. YOUNG.
ICE CREAM FREEZER DASHER.
APPLICATION FILED APR. 30, 1909.
1,033,649.
Patented July 23, 1912.
3 SHEETS—SHEET 3.
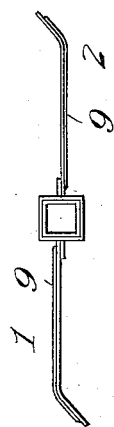
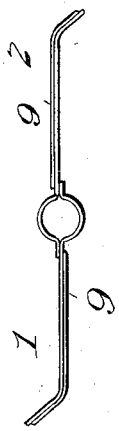
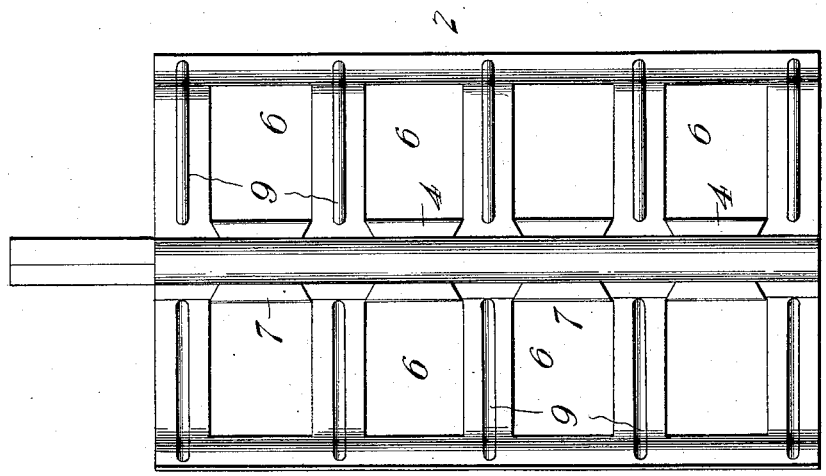

UNITED STATES PATENT OFFICE.

ELMER I. YOUNG, OF MONTCLAIR, NEW JERSEY, ASSIGNOR TO ACME FREEZER COMPANY, OF PHILADELPHIA, PENNSYLVANIA, A CORPORATION OF PENNSYLVANIA.

ICE-CREAM-FREEZER DASHER.

1,033,649.  Specification of Letters Patent.  Patented July 23, 1912.

Application filed April 30, 1909. Serial No. 493,133.

*To all whom it may concern:*

Be it known that I, ELMER I. YOUNG, a citizen of the United States, residing at Montclair, in the county of Essex and State of New Jersey, have invented certain new and useful Improvements in Ice-Cream-Freezer Dashers; and I do hereby declare the following to be a full, clear, and exact description of the invention, such as will enable others skilled in the art to which it appertains to make and use the same.

This invention relates to improvements in ice cream freezers, and more particularly is concerned with the dashers thereof.

In U. S. Letters Patent No. 949,692 granted to me February 15, 1910 is disclosed a construction of dasher primarily designed to be formed from stamped metal, whereby to materially reduce the cost of the freezer of which it forms a part, and provide a freezer that can be marketed at a comparatively low figure. The dasher of the patent referred to, however, is of such construction that the parts thereof are soldered together, in order to be maintained in proper relation to each other, and this feature renders the dasher objectionable in view of the fact that the solder is subject to attack by the ingredients of the ice cream during the freezing operation. Furthermore, these ingredients pass into the portions of the dasher at which the solder is applied, and it is extremely difficult to dislodge the same therefrom, thus rendering the dasher subject to unsanitary conditions.

It is therefore the object of the present invention to provide a dasher which, while still formed of stamped metal, is of such construction that the parts thereof are firmly held together without the employment of solder, thus eliminating the objectionable features incident to the dasher of my previous patent.

With these general objects in view, and others that will appear as the nature of the improvements is better understood, the invention consists substantially in the novel construction, combination and arrangement of parts, hereinafter fully described, illustrated in the accompanying drawings, and pointed out in the appended claims.

In the drawings—Figure 1 is an elevation of the blank from which the major member of the dasher is formed. Fig. 2 is a similar view of the blank for the formation of the minor member. Fig. 3 is a similar view illustrating the step in the formation of the major member by which the openings therein and the inner holding flanges are formed. Fig. 4 is a similar view of the step for the formation of the openings in the minor member. Fig. 5 is an elevation illustrating the condition of the major member after the same has been subjected to the required action for imparting the necessary contour thereto; forming the strengthening ribs in the flat portion of the member, and turning the holding flanges and the head of the member to the required position to be clamped into engagement with the minor member. Fig. 6 is an end elevation of the construction illustrated in Fig. 5. Fig. 7 is a view of the minor member, similar to Fig. 5. Fig. 8 is an end elevation of the construction illustrated in Fig. 7, the dotted lines indicating the position assumed by the head when the latter is folded to approximately closed position. Fig. 9 is an elevation of the dasher with the members in assembled relation, and the holding flanges folded to clamped position, this figure illustrating the completed formation of the dasher. Fig. 10 is a top plan view of the dasher. Fig. 11 is an inverted plan view thereof.

The hereindescribed dasher is formed of two members which are substantially complements or counterparts of each other. Slight differences exist, however, and in order that the same may be distinguished it is proposed to designate one of these as the "major" member, and the other as the "minor" member. Referring, therefore, to the drawings in detail, the numeral 1 designates the blank from which the major member is formed, and 2 the blank employed for the formation of the minor member. The major blank 1 has formed at one of its ends a rectangular engaging element 3 which projects slightly beyond the inner marginal edge of the blank, said engaging element being arranged at the point on the blank which, in the subsequent operation upon the blank, becomes the head of the major member. This blank 1 is also provided at the inner marginal edge with spaced elongated flanges 4, which constitute part of the means for holding the major member upon the minor member. The latter is also provided at one of its ends with an engaging element 5, and this is positioned upon the minor member 2 in a manner similar to the arrangement of the engaging element 3 upon the major blank 1. In the next step in the treatment of the blanks 1 and 2 portions thereof are punched or cut out to provide a plurality of openings 6, and in the formation of these openings in the blank of the major member additional holding flanges 7 are formed at the inner ends of said openings, said flanges 7 lying opposite to the flanges 4. As will also be observed by reference to Figs. 3 and 4, the engaging elements 3 and 5 are provided with inwardly-extending slits or cuts 8, to permit these engaging elements to be suitably folded for interengagement.

After the treatment which brings the blanks 1 and 2 to the condition illustrated in Figs. 3 and 4, these blanks are subjected to further treatment, such as by the action of suitable dies, to impart to the members transversely-extending strengthening ribs 9, and to deflect the outer edges at slightly obtuse angles to the bodies thereof in order to incline these outer edges. As will appear by reference to Figs. 6 and 8, the engaging elements 3 and 5 are so treated that the side portions are bent up into substantially parallel position; the inner edges of the blanks are concaved, and the holding flanges 4 and 7 of the major member 1 are bent up into substantially parallel position. The members 1 and 2 are now ready for assembling upon each other, but before doing this the engaging element 5 of the minor member is folded over into the position illustrated by the dotted lines in Fig. 8, whereby said element becomes approximately closed. The minor member is now placed upon the major member, the inner edge portion fitting between the holding flanges 4 and 7 of the major member, and the folded engaging element of the minor member being received within the folded side portions of the engaging element of the major member. In the next step of the treatment of the members 1 and 2 the parallel side portions of the engaging element 3 of the major member 1 are folded around the closed engaging element of the minor member, and pressed into locked engagement, while the holding flanges 4 and 7 are also pressed down upon the inner edge portion of the minor member 2. The two members are now locked together, the interengaged elements 3 and 5 constituting a single head for the dasher, the inclined outer edge of each member being reversely arranged to the inclined outer edge of the other member, and the concaved inner portions of the members occupy positions opposite to each other. Thus a tubular shank, substantially circular in cross section, is formed at the central portion of the completed dasher designed to receive the shank of the operating handle that is associated with the dasher for imparting rotation to the freezer can. The interengaged elements of the members 1 and 2 provide means for holding the dasher in position within the freezer can. After the forming steps have been completed, the dasher may be subjected to a tinning operation for depositing a coating of tin thereon, and presenting to the dasher a finished appearance.

By reason of the foregoing, it will be seen that a dasher is provided that is exceedingly simple in construction, but perfectly rigid, thereby imparting strength to the dasher, and it will also be noted that the dasher being flat, it is possible to freeze the cream much harder than under ordinary conditions, this flattened condition of the dasher enabling the latter to be readily withdrawn from the cream when the latter has assumed its hardest consistency.

Having thus described the invention, what is claimed as new, and desired to be secured by Letters Patent, is:—

1. A dasher of the class described, comprising a plurality of overlapping members, means for locking said members together, and a head carried by said members at one end of the dasher for holding the dasher in position within the freezer can.

2. A dasher of the class described, comprising a plurality of members the inner edges of which overlap, securing means carried by one of said members and engaging the overlapping portion of the other member for locking said members together, and interengaging elements carried by said members.

3. A dasher of the class described, comprising a plurality of members the inner edges of which overlap, securing means carried by one of said members and engaging the overlapping portion of the other member for locking said members together, an engaging element carried by each of said members, and means whereby one of said elements is held within the other.

4. A dasher of the class described, comprising a plurality of members the inner edges of which are overlapped, said inner edges being depressed in the direction of their length and coöperating with each other to form a longitudinal tubular shank at the central portion of the dasher, and holding flanges carried by one of said members and arranged at opposite sides of the depressed portion thereof, said flanges engaging the inner edge of the other member at opposite sides of its depressed portion to hold said edges in clamped position.

5. A dasher of the class described, comprising a plurality of members the inner edges of which are overlapped, holding flanges arranged at the inner edge of one of said members and engaging with the inner edges of the other member, whereby to hold the said members in clamped position, and an engaging element carried by each of said members, the element of one member being received by the element of the other and clamped therein.

6. A dasher of the class described, comprising a plurality of members arranged upon each other, and means carried by one of said members and embracing the opposite member, whereby said members are locked together.

7. A dasher of the class described, comprising a plurality of members arranged upon each other, means carried by one of said members and embracing the opposite member, whereby said members are locked together, and interengaging elements carried by said members.

8. A dasher of the class described, comprising a plurality of members arranged upon each other, said members being depressed in the direction of their length, the depressed portions coöperating with each other to form a longitudinal tubular shank, and holding flanges carried by one of said members and arranged at opposite sides of the depressed portion thereof, said flanges engaging the opposite member at opposite sides of the depressed portion to hold said members in clamped position.

9. A dasher of the class described, comprising a plurality of members arranged upon each other, means for locking said members together, and an engaging element carried by each of said members, the element of one of said members fitting within the element of the opposite member, whereby said elements are held in inter-engaged relation.

10. A dasher of the class described, comprising a plurality of members arranged upon each other, said members being depressed in the direction of their length, the depressed portions coöperating with each other to form a longitudinal tubular shank, holding flanges carried by one of said members and arranged at opposite sides of the depressed portion thereof, said flanges engaging the opposite member at opposite sides of its depressed portion to hold said members in clamped position, and an engaging element carried by each of said members, the element of one of said members fitting within the element of the opposite member, whereby said elements are held in inter-engaged relation.

In testimony whereof I affix my signature, in the presence of two witnesses.

ELMER I. YOUNG.

Witnesses:
  CECELIA V. COCKERY,
  JULIUS B. PRICE, Jr.

---

Copies of this patent may be obtained for five cents each, by addressing the "Commissioner of Patents, Washington, D. C."